Feb. 14, 1956  J. VAGHI  2,734,312
FLOWER HOLDER AND PROTECTOR
Filed Jan. 26, 1954
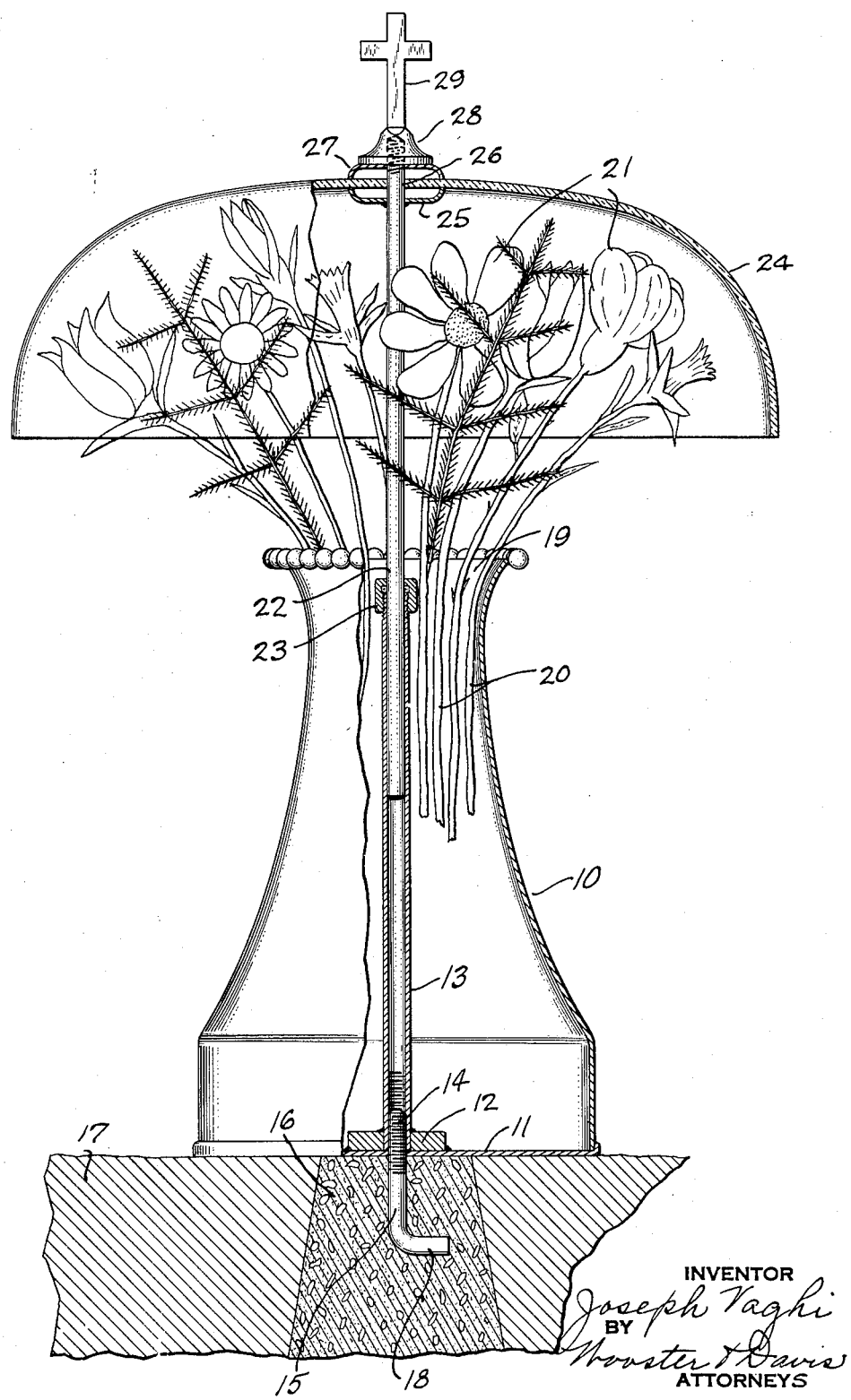
INVENTOR
Joseph Vaghi
BY
Wooster & Davis
ATTORNEYS the flowers are clearly visible through it, but as it extends over and down around the flowers they are protected by it from the wind and rain, so they are kept arranged in their original attractive condition indefinitely.

United States Patent Office 2,734,312
Patented Feb. 14, 1956

2,734,312

FLOWER HOLDER AND PROTECTOR

Joseph Vaghi, Bethel, Conn.

Application January 26, 1954, Serial No. 406,178

5 Claims. (Cl. 47—41)

This invention relates to a flower holder and protector, particularly a device of this character which may be used for holding flowers at a grave in a cemetery, and has for an object to provide such a holder which is adapted for holding either natural or artificial flowers, and which will hold them in such a way as to maintain them in the form of a bunch or bouquet artistically arranged for the most desirable effect, and will also protect them from damage by wind or rain and maintain them in good condition without interfering with the visibility and desired decorative effect.

Another object is to provide a device with means whereby it may be effectively anchored in position so that it will not be blown over or displaced.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a partial side elevation and partial vertical section of the device showing it in use.

The device as shown comprises a base or vase portion 10 preferably of copper or similar material which is rust and corrosion resistant, but it could be made of any suitable material, and secured to the bottom 11 of this member by a brass or similar plate 12 is an upright brass or similar tube 13. The plate 12 is soldered or welded to the bottom wall 11 and the tube 13 so as to make it water-tight. The base or bottom wall 11 of the container has an opening in alignment with the lower end of the tube 13 to receive the projecting end 14 of an anchoring bolt 15 which is threaded into the lower end of the tube 13, the anchoring bolt being preferably of brass or similar material so as to be rust proof. It is molded into a foundation 16 such, for example, as a concrete block which is set into the ground 17 at a grave in the cemetery. The inner or lower end of the anchoring bolt is preferably bent laterally, as indicated at 18, to more effectively anchor it in this block. The vase member and cover may be readily detached and removed by merely unscrewing it from the anchoring bolt.

The top of the container 10 is open, as shown at 19, for insertion of the stems 20 of a bunch or bouquet of flowers, either natural or artificial, and if natural flowers are used the base or vase portion 10 is adapted to hold water to maintain them in a fresh condition. Adjustably mounted in the top of the tube 13 for vertical or longitudinal adjustment is a rod 22 telescoped at its lower end into the tube 13. It is therefore adjustable to different heights and may be secured in different adjusted positions by any suitable means, such, for example, as a suitable clamping nut 23. This rod carries over the flowers a dome-shaped cover 24 of transparent material. This could be glass, but preferably is of a transparent plastic as it is less likely to be broken. As this cover is transparent the flowers are clearly visible through it, but as it extends over and down around the flowers they are protected by it from the wind and rain, so they are kept arranged in their original attractive condition indefinitely. This dome-shaped cover may be secured to the rod 22 by any suitable means, but a simple and effective means comprises a lower flange 25 fixed to the rod by any suitable means such as welding or soldering, the cover being provided with an opening 26 to receive the upper end of the rod so the cover can rest on the flange 25, and then it is secured by a loose flange 27 on top of it and clamped to it by the base or nut 28 threaded to the upper end of the rod. This nut may carry any suitable ornament 29.

It will be understood from the above that this device will be very effective when used for holding a bunch of flowers, either natural or artificial, at a grave in a cemetery, it being anchored to the foundation or base 16 to prevent its being displaced or turned over by the wind; also that the transparent dome or cover 24, as it extends over and down around and encloses the flowers, effectively covers and protects these flowers from the rain, wind and other weather conditions, but at the same time these flowers are clearly visible at all times so that their decorative effect and attractiveness is in no way impaired. Also this protection will maintain the flowers in a fresh natural condition for a long time.

Having thus set forth the nature of my invention I claim:

1. A flower holder and protector of the character described comprising a hollow upright vase member closed at the bottom and open at the top to receive the stems of a bouquet of flowers, a mounting for the vase comprising a foundation block adapted to be set in the ground at a grave, means anchoring the base of the vase to the block, a hollow transparent dome, and supporting means secured to the said anchoring means and extending above the upper end of the vase to support the dome over and enclosing flowers in the vase.

2. A flower holder and protector of the character described comprising a hollow upright vase member closed at the bottom and open at the top to receive the stems of a bouquet of flowers, a mounting for the vase comprising a foundation block adapted to be set in the ground at a grave, means anchoring the base of the vase to the block, an upright tube mounted in the vase, an upright rod telescoped for longitudinal adjustment in the tube, means securing the rod in adjusted positions, and an inverted transparent hollow dome-shaped cover mounted on the rod over the top of the vase in position to enclose and protect a bouquet of flowers in the vase.

3. A flower holder and protector of the character described comprising a hollow upright vase member closed at the bottom and open at the top to receive the stems of a bunch of flowers, an upright tube secured to the bottom wall of the vase member over an opening in this wall, a foundation block adapted to be set in the ground at a grave, means anchoring the vase member to the block comprising an anchoring bolt anchored in the block and including an upper end projecting above the block and threaded into the lower end of the tube, and an inverted transparent hollow dome-shaped cover mounted on the tube over the top of the vase in position to enclose and protect a bunch of flowers in the vase.

4. A flower holder and protector of the character described comprising a hollow upright vase member closed at the bottom and open at the top to receive the stems of a bouquet of flowers, a mounting for the vase comprising a foundation block adapted to be set in the ground at a grave, means detachably anchoring the base of the vase member to the block, an upright tube secured to the bottom wall of the vase member, a rod telescoped in the upper end of this tube for vertical adjustment, means securing the rod in adjusted positions, a fixed flange on the rod, an inverted transparent hollow dome-shaped cover provided with an opening receiving the upper end of the rod and seating on the flange, and a nut threaded on the upper end of the rod above the cover and clamping it to the flange, said rod being adjustable in the tube to position the cover immediately over the top of the vase to enclose and protect a bunch of flowers in the vase.

5. A flower holder and protector of the character described comprising a hollow upright vase member closed at the bottom and open at the top to receive the stems of a bunch of flowers, an upright tube secured to the bottom wall of the vase member over an opening in this wall, a foundation block adapted to be set in the ground at a grave, means anchoring the vase member to the block comprising an anchoring bolt anchored in the block and including an upper end projecting above the block and threaded into the lower end of the tube, a rod telescoped in the upper end of the tube for vertical adjustment, means securing the rod in adjusted positions, and an inverted transparent hollow dome-shaped cover secured to the rod over the top of the vase member in position to enclose and protect a bunch of flowers in the vase member.

References Cited in the file of this patent

UNITED STATES PATENTS

| | | |
|---|---|---|
| 1,419,152 | Lansing et al. | June 13, 1922 |
| 1,448,808 | McGowan | Mar. 20, 1923 |
| 2,113,688 | Grant | Apr. 12, 1938 |
| 2,276,648 | Fuller | Mar. 17, 1942 |
| 2,580,948 | Pancake | Jan. 1, 1952 |

FOREIGN PATENTS

| | | |
|---|---|---|
| 22 | Great Britain | Jan. 1, 1890 |
| 470,621 | Great Britain | Aug. 18, 1937 |